(12) United States Patent
Skinner et al.

(10) Patent No.: US 7,458,273 B2
(45) Date of Patent: Dec. 2, 2008

(54) FIBER OPTIC DIFFERENTIAL PRESSURE SENSOR

(75) Inventors: Neal G. Skinner, Lewisville, TX (US); John R. Dennis, Bozeman, MT (US); Donald H. Perkins, Carrollton, TX (US)

(73) Assignee: Welldynamics, B.V., Leiderdorp (NL)

( * ) Notice: Subject to any disclaimer, the term of this patent is extended or adjusted under 35 U.S.C. 154(b) by 0 days.

(21) Appl. No.: 11/558,372

(22) Filed: Nov. 9, 2006

(65) Prior Publication Data

US 2007/0068262 A1 Mar. 29, 2007

Related U.S. Application Data

(62) Division of application No. 10/868,077, filed on Jun. 15, 2004, now Pat. No. 7,159,468.

(51) Int. Cl.
*G01L 13/02* (2006.01)
(52) U.S. Cl. .............................. 73/736; 73/716; 73/753
(58) Field of Classification Search ............ 73/700–756
See application file for complete search history.

(56) References Cited

U.S. PATENT DOCUMENTS

| 2,718,145 | A | 9/1955 | Nisle |
|---|---|---|---|
| 3,844,173 | A | 10/1974 | Rockstead |
| 3,855,857 | A | 12/1974 | Claycomb |
| 4,078,432 | A | 3/1978 | Stewart |
| 4,366,714 | A | 1/1983 | Adomi |
| 4,643,024 | A | 2/1987 | Kovari |
| 4,738,140 | A | 4/1988 | Kempf |
| 4,805,449 | A | 2/1989 | Das |
| 4,893,505 | A | 1/1990 | Marsden |
| 5,024,098 | A | 6/1991 | Petitjean |
| 5,343,963 | A | 9/1994 | Bouldin |
| 5,386,729 | A | 2/1995 | Reed |
| 5,460,049 | A | 10/1995 | Kirsch |
| 5,520,054 | A | * | 5/1996 | Romo ......................... 73/715 |
| 5,637,865 | A | 6/1997 | Bullat |
| 5,649,035 | A | 7/1997 | Zimmerman |
| 5,670,720 | A | 9/1997 | Clark |
| 5,792,959 | A | 8/1998 | Marchant |
| 5,892,860 | A | 4/1999 | Maron |
| 5,925,879 | A | 7/1999 | Hay |
| 6,016,702 | A | 1/2000 | Maron |
| 6,246,048 | B1 | 6/2001 | Ramos |
| 6,304,686 | B1 | 10/2001 | Yamate |
| 6,351,987 | B1 | 3/2002 | Winston |
| 6,550,322 | B2 | 4/2003 | Sweetland |

(Continued)

OTHER PUBLICATIONS

International Search Report for PCT/US02/23272, no date.

(Continued)

*Primary Examiner*—Andre J. Allen
*Assistant Examiner*—Jermaine Jenkins
(74) *Attorney, Agent, or Firm*—Smith IP Services, P.C.

(57) ABSTRACT

A fiber optic differential pressure sensor. In a described embodiment, a differential pressure sensor system for use in a subterranean well includes a fluid property sensing housing having a flow passage formed therethrough. A differential pressure sensor has an optical fiber extending in a wall having a first side and a second side, each of the first and second sides being exposed to pressure in the flow passage.

13 Claims, 6 Drawing Sheets

U.S. PATENT DOCUMENTS

| | | |
|---|---|---|
| 6,575,025 B1 | 6/2003 | Demia |
| 6,597,821 B1 | 7/2003 | Bohnert |
| 6,630,658 B1 | 10/2003 | Bohnert |
| 6,668,656 B2 | 12/2003 | Fernald |
| 6,740,866 B1 | 5/2004 | Bohnert |
| 6,910,388 B2 * | 6/2005 | Jones .................. 73/861.63 |
| 6,951,252 B2 | 10/2005 | Restarick |
| 6,957,576 B2 | 10/2005 | Skinner et al. |

OTHER PUBLICATIONS

A.D. Kersey, et al., "Fiber-optic systems for reservoir monitoring," World Oil, Oct. 1999, pp. 91-93, 96, 97.

Alan D. Kersey, "A review of Recent Developments in Fiber Optic Sensor Technology," Optical Fiber Technology, article No. 0036, 1996.

* cited by examiner

FIBER OPTIC DIFFERENTIAL PRESSURE SENSOR

CROSS-REFERENCE TO RELATED APPLICATION

The present application is a division of application Ser. No. 10/868,077 filed Jun. 15, 2004 now U.S. Pat. No. 7,159,468, the entire disclosure of which is incorporated herein by this reference.

BACKGROUND

The present invention relates generally to equipment utilized and operations performed in conjunction with a subterranean well and, in an embodiment described herein, more particularly provides a fiber optic differential pressure sensor.

It is known to use an optical fiber to detect strain in a member due to pressure applied to the member in a well. The detected strain may then be used to determine the pressure applied to the member.

However, prior optical fiber sensors have not been able to detect certain differential pressures in a well, such as a difference between pressures in two different portions of a flow passage in a tubing string. The ability to detect differential pressures in a well, especially the difference between two variable pressures in a well, would enable certain fluid properties to be determined more directly and without the need to use multiple sensors to individually detect the various pressures. A single sensor capable of directly detecting a differential pressure would also be more accurate than calculating the difference between different readings from multiple absolute or gauge pressure sensors.

Therefore, it may be seen that it would be beneficial to provide improved differential pressure sensors and sensor systems for use in wells. These sensors and sensor systems could find use in other applications, as well.

SUMMARY

In carrying out the principles of the present invention, in accordance with an embodiment thereof, a differential pressure sensor system is provided which is an improvement over prior sensor systems. The provided sensor system can be used to determine parameters of fluid flowing through a tubular string in a well.

In one aspect of the invention, a differential pressure sensor system for use in a subterranean well is provided. The system includes a generally tubular fluid property sensing housing having a flow passage formed therethrough. A differential pressure sensor has an optical fiber extending in a wall having a first side and a second side. Each of the first and second sides is exposed to pressure in the flow passage.

In another aspect of the invention, a differential pressure sensor system includes a differential pressure sensor with a wall having a first side and a second side. An optical fiber is attached to a member of the wall, so that the optical fiber detects strain in the member. The wall first side is in communication with a first pressure source external to the sensor, and the wall second side is in communication with a second pressure source external to the sensor.

In yet another aspect of the invention, a differential pressure sensor system includes a differential pressure sensor with a wall having an interior and an exterior. An optical fiber is attached to a generally tubular member of the wall, so that the optical fiber detects strain in the tubular member. An outer housing has a first port for providing communication between the wall interior and a first pressure source external to the housing, and a second port for providing communication between the wall exterior and a second pressure source external to the housing.

In a further aspect of the invention, a differential pressure sensor system includes a differential pressure sensor including a wall having a first side and a second side, with an optical fiber attached to a generally disc-shaped member of the wall. The optical fiber detects strain in the disc-shaped member. An outer housing has a first port for providing communication between the wall first side and a first pressure source external to the housing, and a second port for providing communication between the wall second side and a second pressure source external to the housing.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
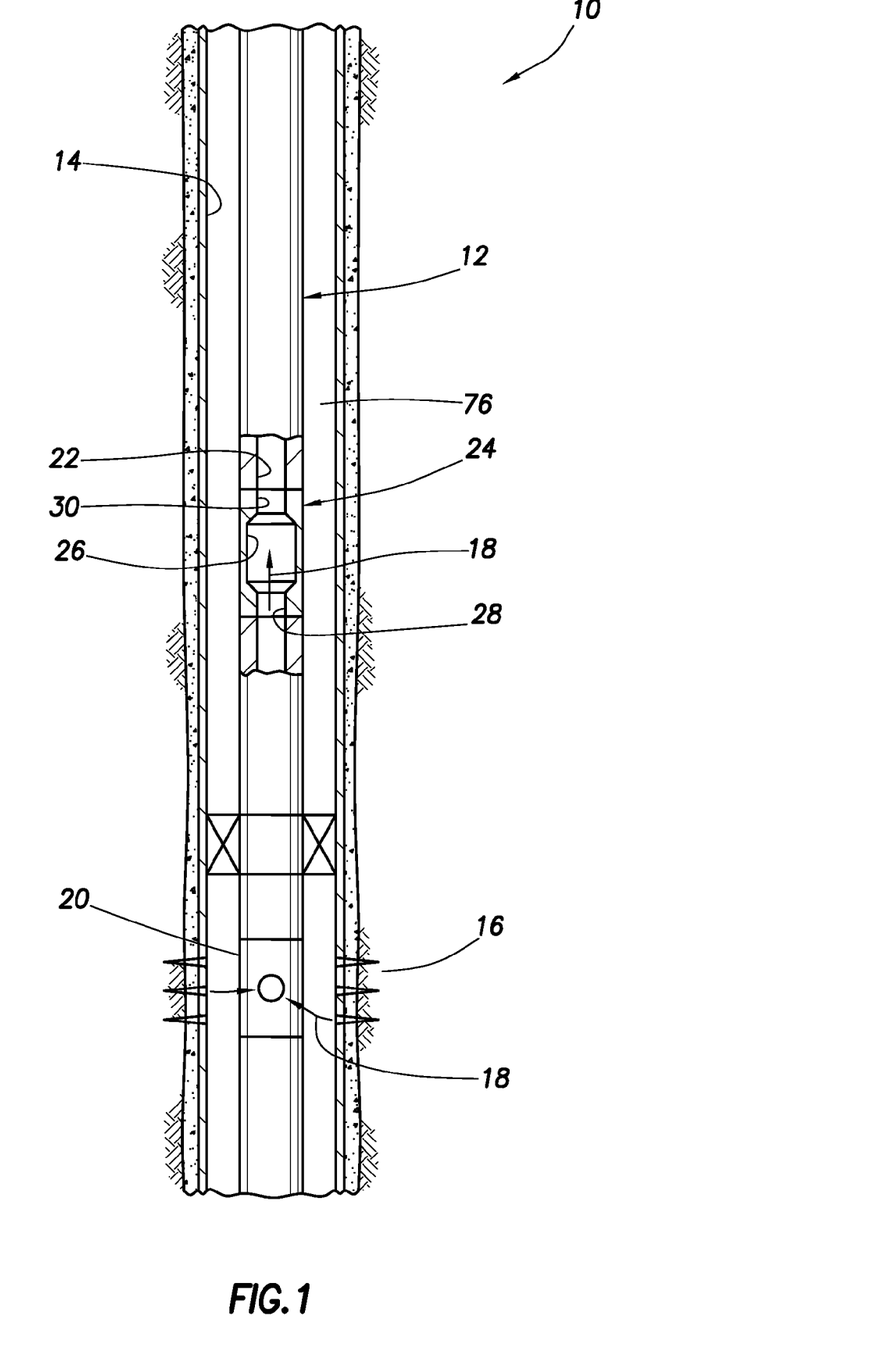
FIG. 1 is a schematic cross-sectional view of a differential pressure sensor system embodying principles of the present invention.

Representatively illustrated in FIG. 1 is a fluid property sensing system 10 which embodies principles of the present invention. In the following description of the system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

As depicted in FIG. 1, the system 10 includes a tubular string 12 positioned in a wellbore 14 of a well which intersects a formation or zone 16. Fluid (flow indicated by arrows 18) enters the tubular string 12 at a valve 20 and flows upwardly through a flow passage 22 of the tubular string. The fluid 18 eventually flows through a generally tubular fluid property sensing housing 24 interconnected in the tubular string 12.

Note that it is not necessary for the fluid 18 to flow in any particular direction through the tubular string 12, for the tubular string to be a production tubing string, coiled tubing string, casing string, liner string, or any particular type of tubular string, for the flow passage 22 to be formed in the tubular string, for the fluid to originate in the zone 16 and enter the tubing string via the valve 20, etc. The fluid 18 could instead be injected into the zone 16 or flowed to a remote location, the flow passage 22 could be formed in any structure, the fluid could originate or enter the system 10 at any location, etc. Thus, it should be clearly understood that the principles of the invention are not limited in any way to the specific details of the embodiments described herein. Instead, the embodiments are described merely as examples of useful applications of the principles of the invention.

In the system 10, it would be beneficial to be able to determine various differential pressures in the fluid 18 as it flows through the housing 24. A radially enlarged portion 26 of the passage 22 is formed in the housing 24 longitudinally between passage portions 28, 30 upstream and downstream, respectively, of the enlarged portion 26. Accordingly, the passage 22 has a greater flow area in the portion 26 as compared to the upstream and downstream portions 28, 30.

Preferably, the passage portions 28, 30 have inner diameters equivalent to that of the remainder of the passage 22 in the tubular string 12, and the enlarged portion 26 has an inner diameter greater than that of the other portions 28, 30. In this manner, the housing 24 and the passage portions 26, 28, 30 do not restrict access or flow through the tubular string 12. However, some restriction could occur without departing from the principles of the invention.

The fluid 18 has a pressure as it flows through the tubular string 12. As the fluid 18 flows from the passage portion 28 to the passage portion 26, the fluid pressure should decrease (due to the increase in flow area and the resultant decrease in flow velocity), and as the fluid flows from the passage portion 26 to the passage portion 30, the fluid pressure should increase (due to the decrease in flow area and the resultant increase in flow velocity), according to the Bernoulli Principle. If the pressure differential between the passage portions 26, 28 or 26, 30 can be detected, then for fixed values of the known flow areas of the passage portions, the flow rate of the fluid 18 may be determined.

If the density of the fluid 18 can be detected, then the determination of the flow rate of the fluid 18 can be more accurately calculated. The density of the fluid 18 can be detected in the system 10 by detecting the pressure differential between the passage portions 28, 30. For this purpose, the passage portions 28, 30 preferably have the same flow area. A known true vertical distance h (see FIG. 12) between the positions at which the pressure differential between the passage portions 28, 30 is detected, along with the value of the pressure differential itself, enables an accurate determination of the density of the fluid 18. If the positions at which the pressure differential between the passage portions 28, 30 is detected are not truly vertical relative to each other, i.e., if they are deviated from true vertical by an angle θ, then the true vertical distance h may be calculated by the formula h=h' cos θ, where h' is the non-vertical distance between the positions. Note that the density of the fluid 18 may be determined by the pressure differential in the fluid at any known vertical distance between positions at which the pressure differential is detected, not necessarily in the specific passage portions 28, 30 or even in the housing 24, in keeping with the principles of the invention.

Figure 2:
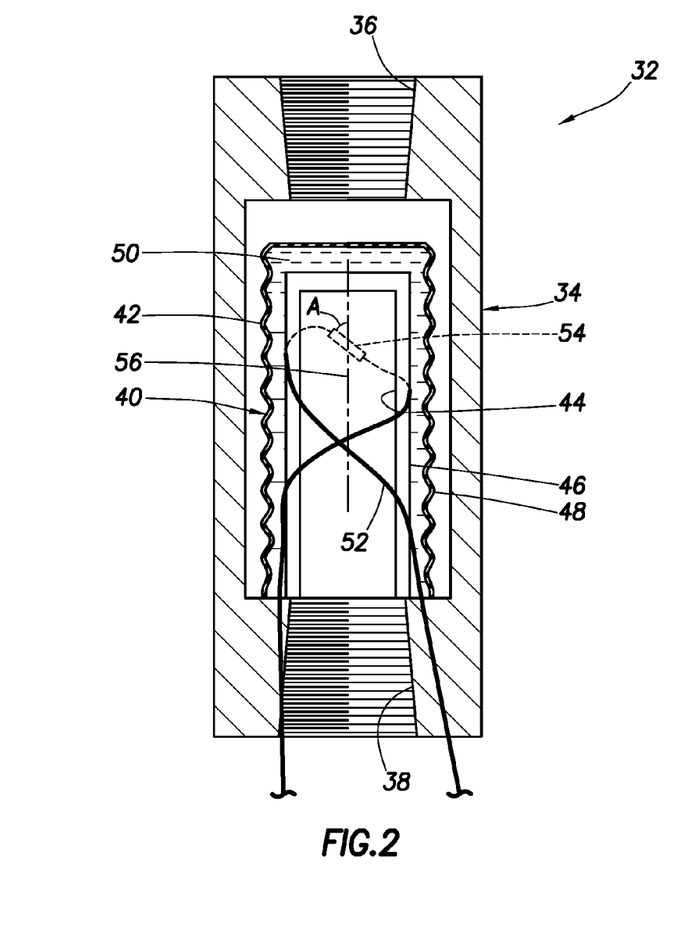
FIG. 2 is an enlarged scale cross-sectional view of a first differential pressure sensor which may be used in the system of FIG. 1.

Referring additionally now to FIG. 2, a differential pressure sensor 32 is representatively illustrated. The sensor 32 may be used in the system 10, for example, to detect the pressure differential between the passage portions 26, 28 or between the passage portions 26, 30 (to determine flow rate of the fluid 18), or between the passage portions 28, 30 (to determine density of the fluid). However, it should be understood that the sensor 32, and other sensors described below, could be used in other applications in keeping with the principles of the invention.

The sensor 32 includes an outer housing 34 having ports 36, 38 for communicating an interior of the housing with two pressure sources (such as the passage portions 26, 30, or passage portions 26, 28, or passage portions 28, 30). A generally tubular wall 40 separates the pressure sources in the housing 34, so that fluid pressure from one of the pressure sources is applied to an outer side 42 of the wall, and fluid pressure from the other pressure source is applied to an inner side 44 of the wall. Thus, the wall 40 is subjected to a pressure differential between the pressure applied to the outer side 42 and the pressure applied to the inner side 44 of the wall.

The wall 40 is depicted in FIG. 2 as being of cylindrical tubular shape, with one closed end. The port 38 communicates with an open end of the wall 40. However, it should be understood that it is not necessary for the wall 40 to have any particular shape or configuration for communicating fluid pressures to its sides 42, 44 in keeping with the principles of the invention.

The wall 40 includes a generally tubular and substantially rigid member 46. A substantially flexible membrane 48 outwardly overlies the member 46. The membrane 48 is depicted in FIG. 2 as being in the shape of a bellows, with folds or creases along its length, but the membrane could have any shape in keeping with the principles of the invention.

A fluid 50 is contained between the member 46 and the membrane 48. The fluid 50 spaces the membrane 48 away from the external surface of the member 46, while still permitting transmission of fluid pressure to the member. In this manner, the member 46 has pressure from one pressure source transmitted via the port 38 to its interior surface, and pressure from the other pressure source transmitted via the port 36, through the membrane 48 and the fluid 50 to its exterior surface.

When a differential exists between the pressures applied to the interior and exterior surfaces of the member 46, the member will experience strain. This strain (either tensile or compressive) is detected by an optical fiber 52 attached to the member 46. Specifically, the optical fiber 52 includes a strain sensing element 54 (such as a fiber Bragg grating or an interferometric element) which is bonded to the exterior surface of the member 46, so that the strain sensing element experiences the same strain as the member due to the applied pressures.

Preferably, the strain sensing element 54 is oriented at an angle A relative to a longitudinal axis 56 of the member 46 for detection of maximum strain in the member due to the applied pressures. The optical fiber 52 is preferably helically wrapped about the exterior of the member 46, and the angle A may be known to those skilled in the art as a layup angle of the helical wrap(s). The angle A is preferably given by the formula:

$$A = \tan^{-1}((2-v)/(1-2v)) \tag{1}$$

wherein v is a Poisson's ratio of a material of which the tubular member 46 is made. Other layup angles could be used in keeping with the principles of the invention.

Preferably, the member 46 is made of a titanium material, such as a Beta-C titanium alloy, or another titanium alloy known as 6-4 ELI with Rubidium doping. This material is preferred in part for its resistance to fluids and contaminants found in wells, and for its resistance to creep, but other materials could be used without departing from the principles of the invention.

The fluid 50 is preferably of a type which is inert with respect to the optical fiber 52, so that the optical fiber is not degraded by exposure to the fluid. One purpose of the membrane 48 is to contain the fluid 50 about the optical fiber 52, so that the optical fiber is not exposed to fluid conveyed into the housing 34 from the pressure source connected to the port 36. Thus, the exterior of the tubular member 46 can be exposed to pressure in the interior of the housing 34, without being directly exposed to the fluid conveyed into the housing from the pressure source connected to the port 36. However, note that the membrane 48 or another type of isolation device (such as a floating piston, another type of membrane, etc.) could be otherwise located, such as external to the housing 34, at the pressure source, etc., and that use of the membrane and fluid 50 is not necessary in keeping with the principles of the invention.

Furthermore, the wall 40 could be differently configured if desired. For example, the optical fiber 52 could be attached to an interior surface of the member 46. In that case, the membrane 48 could be positioned within the member 46, with the fluid 50 also inside the member between the membrane and the member. Alternatively, the optical fiber 52, or at least the strain sensing element 54 could be embedded within the member 46. For example, the member 46 could be made of a plastic or composite material with the optical fiber 52 positioned in a sidewall of the member prior to the material being hardened. In that case, the membrane 48 and fluid 50 may not be used, since the member 46 itself could isolate the optical fiber 52 from fluids in the housing 34.

If the membrane 48 is used, it should be understood that it is not necessary to also use the fluid 50. For example, the membrane 48 could be a flexible coating applied to the member 46, with the optical fiber 52 being positioned between the membrane and the member. In that case, the membrane 48 would transmit the applied pressure directly to the member 46, without the fluid 50 being used to transmit the pressure from the membrane to the member.

Figure 3:
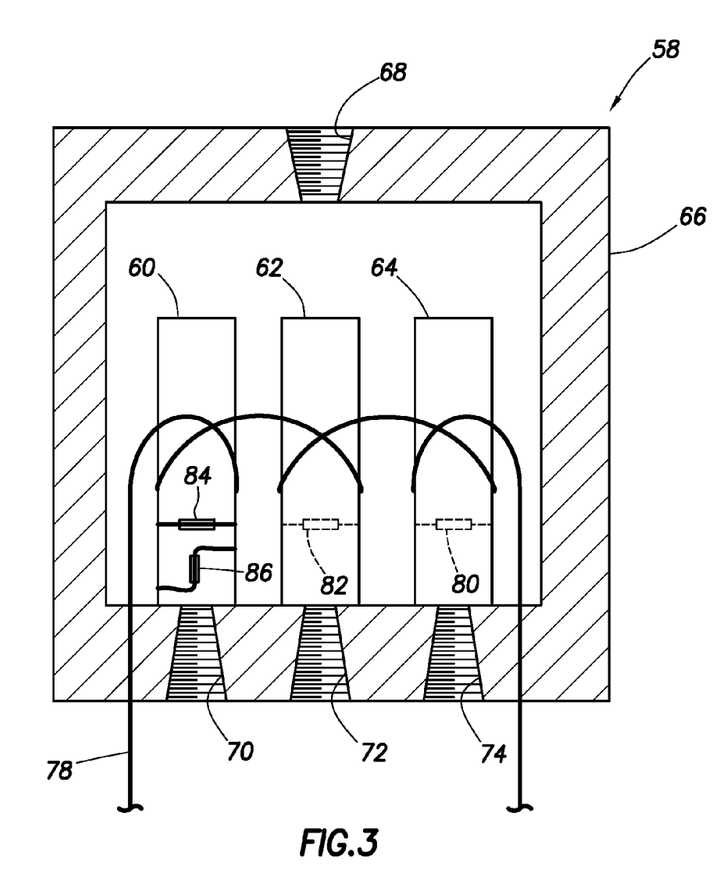
FIG. 3 is a partially cross-sectional view of a second differential pressure sensor which may be used in the system of FIG. 1.

Referring additionally now to FIG. 3, another differential pressure sensor 58 is representatively illustrated. The sensor 58 is similar in some respects to the sensor 32 described above. However, in the sensor 58, multiple tubular members 60, 62, 64 are used to detect corresponding multiple pressure differentials.

The sensor 58 includes an outer housing 66 having ports 68, 70, 72, 74 for connection to various pressure sources. For example, the port 68 could be in communication with the passage portion 28 in the system 10 of FIG. 1, while the port 70 could be in communication with the passage portion 26, and the port 72 could be in communication with the passage portion 30. The port 74 could be in communication with an annulus 76 between the tubular string 12 and the wellbore 14.

The port 68 is in communication with the exterior of each of the members 60, 62, 64, while each of the other ports 70, 72, 74 is in communication with the interior of a respective one of the members. Thus, the member 60 will experience strain due to a pressure differential between the pressure sources in communication with the ports 68, 70, the member 62 will experience strain due to a pressure differential between the pressure sources in communication with the ports 68, 72, and the member 64 will experience strain due to a pressure differential between the pressure sources in communication with the ports 68, 74.

It will be readily appreciated that the sensor 58 used in the system 10 as described above will permit determination of the pressure differential between the passage portions 26, 28, the pressure differential between the passage portions 28, 30, the pressure differential between the passage portions 26, 30 (calculated as a difference between the pressure differentials of the passage portions 26, 28 and 28, 30), and the pressure differential between the passage 22 (at the passage portion 28) and the annulus 76. This will enable convenient determination of the fluid 18 density and flow rate using only the single sensor 58.

In addition, only a single optical fiber 78 may be attached to each of the members 60, 62, 64. Thus, only a single sensor using a single optical fiber can be used to determine multiple properties of the fluid 18 in the system 10. This will significantly enhance the convenience and economy of fluid property sensing in wells and in other applications.

The optical fiber 78 has multiple strain sensing elements 80, 82, 84, 86. As depicted in FIG. 3, the strain sensing elements 80, 82, 84 are oriented perpendicular to longitudinal axes of the respective members 64, 62, 60 (i.e., the elements extend circumferentially about the members), and the strain sensing element 86 is oriented parallel to the longitudinal axis of the member 60. The elements 80, 82, 84 may, thus, be used for detecting hoop strain in the members 60, 62, 64, while the element 86 may be used to detect longitudinal strain in the member 60.

Note that the use of differently oriented strain sensing elements 84, 86 on the member 60 can be used to compensate for changes in the temperature of the member. For example, the techniques described in U.S. patent application Ser. No. 10/618,328, filed Jul. 11, 2003, having publication no. 2004-0016295, may be used. The entire disclosure of this prior application is incorporated herein by this reference. The strain sensing element 86 could alternatively be mounted to the housing 66, where the strain sensing element would still experience temperature changes in the member 60, but pressure-induced strain would be negligible or insignificant.

Although the strain sensing elements 80, 82, 84, 86 are depicted in FIG. 3 as being included with the same optical fiber 78, the elements, or any number of them, could be included with other optical fibers, if desired. The strain sensing elements 80, 82, 84, 86 (and/or any of the other strain sensing elements described herein) may be fiber Bragg gratings, interferometric elements, or any other type of strain sensing elements, such as electrical strain sensing elements, etc.

Note that there are no membranes depicted in FIG. 3 for isolating the optical fiber 78 and strain sensing elements 80, 82, 84, 86 from fluid communicated via the port 68 to the exterior of the members 60, 62, 64. This may be due to the use of other isolation means upstream of the port 68, or it may be due to the communicated fluid not being detrimental to the optical fiber 78 and strain sensing elements 80, 82, 84, 86, or for other reasons. However, one or more membrane(s) such as the membrane 48 could be used in the housing 66 in keeping with the principles of the invention. If such a membrane(s) is used, a fluid such as the fluid 50 could also be used between the membrane(s) and the members 60, 62, 64.

Figure 4:
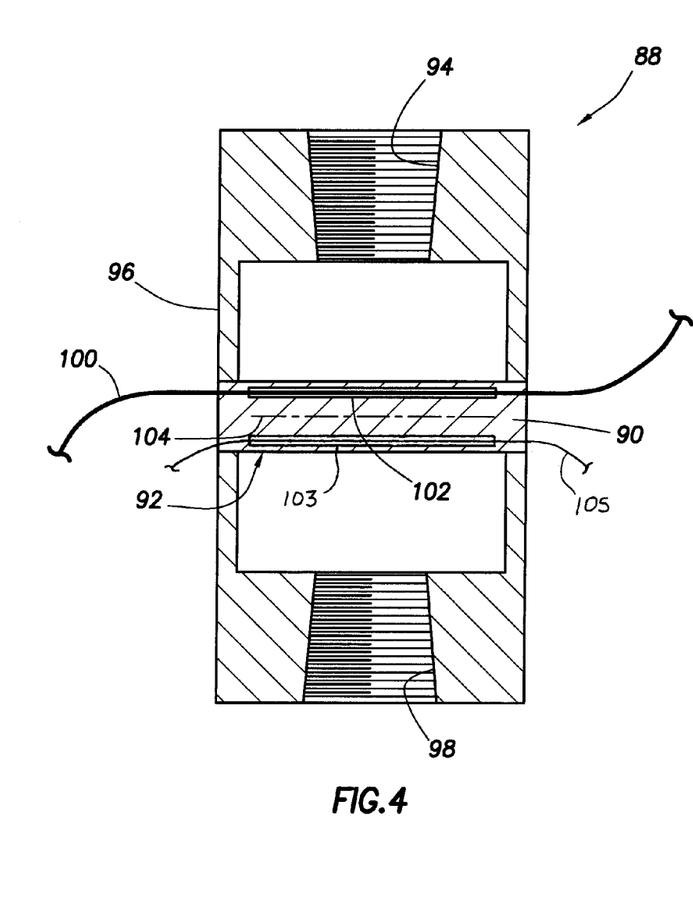
FIG. 4 is a cross-sectional view of a third differential pressure sensor which may be used in the system of FIG. 1.

Referring additionally now to FIG. 4, another differential pressure sensor 88 is representatively illustrated. The sensor 88 is similar in many respects to the sensors 32, 58 described above. One significant difference, however, is that instead of using a tubular wall, the sensor 88 uses a generally planar disc-shaped member 90 in a wall 92 exposed to a pressure differential.

One side of the wall 92 is communicated with a pressure source via a port 98 formed through a housing 96 of the sensor 88, and an opposite side of the wall is communicated with another pressure source via another port 94 in the housing. No membrane is used in the wall 92 as depicted in FIG. 4, since an optical fiber 100 having a strain sensing element 102 is embedded directly in the member 90. However, the optical fiber 100 and strain sensing element 102 could be external to the member 90 and a membrane and fluid, such as the membrane 48 and fluid 50 described above, could be used in keeping with the principles of the invention.

Note that the strain sensing element 102 is preferably positioned in the member 90 spaced apart from a neutral axis 104 of the member. As used herein, the term "neutral axis" is used to indicate a position in a member which is between portions of the member which will experience respective tensile and compressive strains in response to a pressure differential applied to the member. Thus, the element 102 is preferably positioned in the member 90 where it will experience tensile or compressive strain in response to the pressure differential applied across the wall 92.

Whether the element 102 experiences tensile or compressive strain gives an indication of which side of the wall 92 is exposed to higher pressure (i.e., compressive strain will indicate that one side of the wall is exposed to higher pressure, while tensile strain will indicate that the opposite side of the wall is exposed to higher pressure). If the direction of the pressure differential is known beforehand, it is preferred that the element 102 be positioned in the member 90 where it will experience compressive strain in response to the pressure differential, since the element may be made of a material, such as glass fiber, which cannot withstand significant tensile strain without breaking.

The sensor 88 could include another strain sensing element 103 embedded directly in the member 90. The element 103 is depicted in FIG. 4 as being associated with another optical fiber 105, but the elements 102, 103 could be on the same optical fiber, if desired. The optical fiber 105 and strain sensing element 103 could alternatively be attached externally to the member 90 and a membrane and fluid, such as the membrane 48 and fluid 50 described above, could be used in keeping with the principles of the invention to isolate the element and optical fiber from fluid introduced into the housing 96 via the port 98.

Note that the strain sensing element 103 is preferably positioned in the member 90 spaced apart from the neutral axis 104 of the member, but on an opposite side of the neutral axis from the other element 102. In this manner, one of the elements 102, 103 may experience compressive strain while the other element experiences tensile strain due to the pressure differential across the wall 92. Alternatively, either of the elements 102, 103 could be positioned at the neutral axis 104, if desired.

It is not necessary for the member 90 to be circular or cylindrical in shape. Other shapes, such as rectangular, oval, elliptical, etc. may be used if desired.

The member 90 could be made of a titanium material, a polymer, glass, etc. or any other material. Crystalline materials are preferred for their resistance to creep. To embed the optical fibers 100, 105 and strain sensing elements 102, 103 in such materials, they could be sandwiched between layers of the material. The fibers 100, 105 and elements 102, 103 could, for example, be attached in a groove formed in one of the layers prior to attaching the layers to each other.

Figure 5:
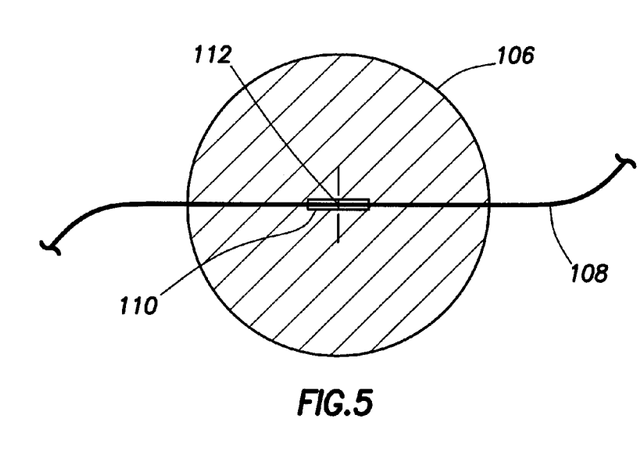
FIG. 5 is a cross-sectional view of a first configuration of a disc-shaped member of the third differential pressure sensor.

Referring additionally now to FIG. 5, a cross-sectional view of another configuration of a disc-shaped member 106 which may be used in the sensor 88 is representatively illustrated. In this configuration, an optical fiber 108 embedded in the member 106 has a strain sensing element 110 which is positioned at a center 112 of the member. The element 110 does not extend a substantial distance away from the center 112 of the member 106.

The element 110 is preferably positioned only in close proximity to the center 112 of the member 106 because strain in the member due to a pressure differential across the member varies substantially at locations progressively farther away from the center. For convenience in interpreting the indications of strain provided by the element 110, it is preferred that the element only experience a very narrow range of strains. Most preferably, the element 110 should only experience a single strain value if possible.

Figure 6:
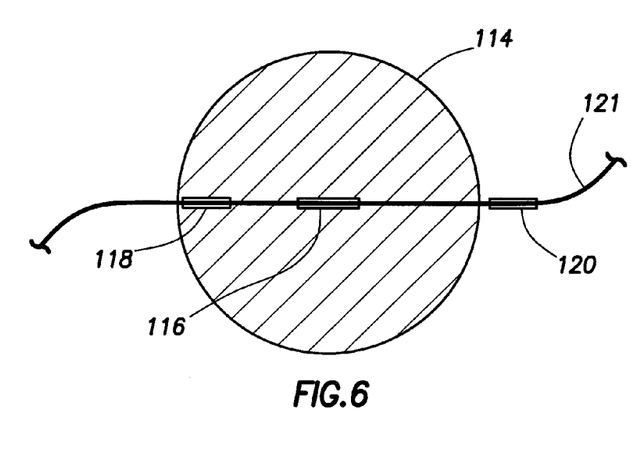
FIG. 6 is a cross-sectional view of a second alternate configuration of the disc-shaped member of the third differential pressure sensor.

Referring additionally now to FIG. 6, another configuration of a disc-shaped member 114 which may be used in the sensor 88 is representatively illustrated. In this configuration, multiple strain sensing elements 116, 118, 120 may be used. The elements 116, 118, 120 may be used with a single optical fiber 121, or multiple optical fibers may be used if desired.

The element 116 is embedded in the member 114 near its center, similar to the positioning of the element 110 in the member 106 described above. The element 118 is embedded in the member 114 at a position spaced apart from the element 116. A comparison of the strains sensed by the elements 116, 118 may be useful in compensating for temperature changes in the member 114, for example, using the techniques described in the incorporated U.S. patent application Ser. No. 10/618,328.

The element 120 is positioned external to the member 114, where the element does not experience strain due to the pressure differential across the member. However, the element 120 does experience an optical change due to temperature changes proximate the member 114, and so the techniques described in the incorporated U.S. patent application Ser. No. 10/618,328 may be used to compensate for such temperature changes. Alternatively, the element 120 may be positioned on a portion of the member 114 which does not experience strain due to the pressure differential applied across the member, but does experience strain due to temperature changes in the member.

Figure 7:
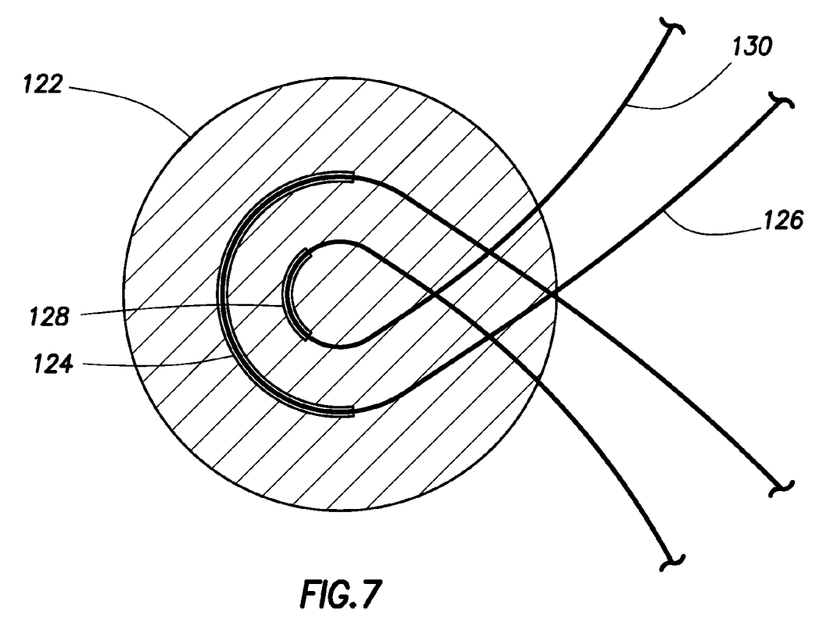
FIG. 7 is a cross-sectional view of a third alternate configuration of the disc-shaped member of the third differential pressure sensor.

Referring additionally now to FIG. 7, another configuration of a disc member 122 which may be used in the sensor 88 is representatively illustrated. In this configuration, a strain sensing element 124 on an optical fiber 126 extends circumferentially, rather than laterally, in the member 122. It is believed that strains along a circumferentially distributed area of the member 122 will be more consistent than strains detected laterally across the member.

Another strain sensing element 128 on another optical fiber 130 may extend circumferentially in the member 122 at another radius spaced apart from the element 124. Since a mathematical relationship should exist between the strains experienced by the different elements 124, 128, these strains may be used to compensate for temperature changes in the member 122 as described in the incorporated U.S. patent application Ser. No. 10/618,328. This mathematical relationship may be difficult to derive theoretically, but it should be relatively straightforward to derive empirically by constructing such a member 122 and subjecting it to various pressure differentials and temperatures, and monitoring the strains indicated by the elements 124, 128.

Figure 8:
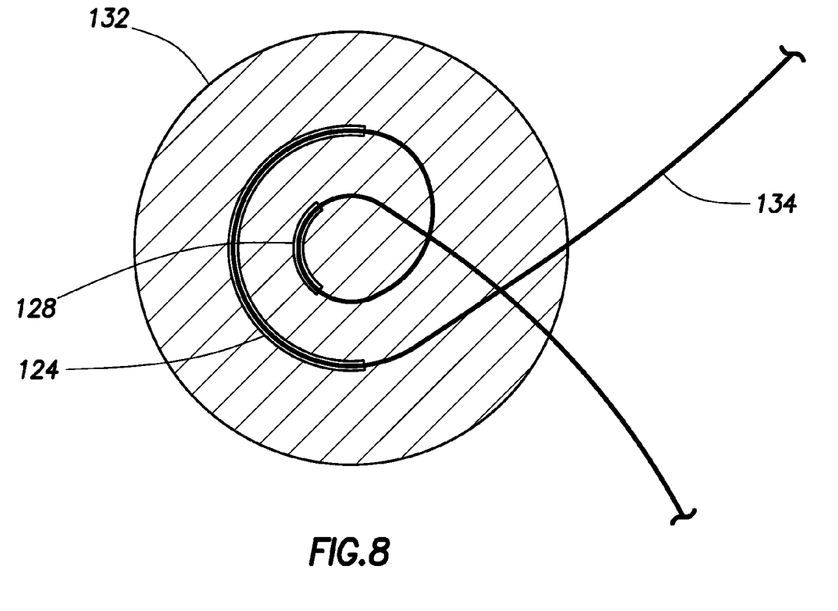
FIG. 8 is a cross-sectional view of a fourth alternate configuration of the disc-shaped member of the third differential pressure sensor.

Referring additionally to FIG. 8, another configuration of a disc-shaped member 132 which may be used in the sensor 88 is representatively illustrated. The member 132 is very similar to the member 122 described above, except that the strain sensing elements 124, 128 are included on a single optical fiber 134 embedded in the member, rather than on multiple optical fibers 126, 130.

Figure 9:
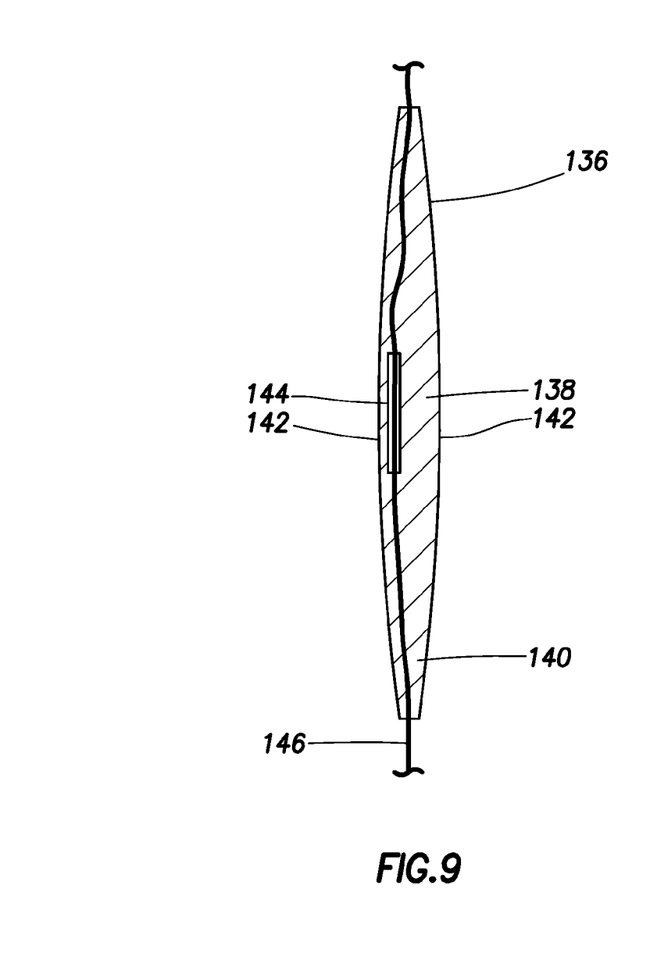
FIG. 9 is a cross-sectional view of a fifth alternate configuration of the disc-shaped member of the third differential pressure sensor.

Referring additionally now to FIG. 9, another configuration of a disc-shaped member 136 which may be used in the sensor 88 is representatively illustrated. In this configuration, the member 136 has a relatively thicker portion 138 located at its center, and a relatively thinner portion 140 at its outer perimeter, or at least spaced radially away from its center. Specifically, the member 136 has two generally convex sides 142.

A strain sensing element 144 on an optical fiber 146 is embedded in the member 136. Preferably, the element 144 is positioned in the thicker portion 138 of the member 136 near its center. It is believed that strains experienced by the element 144 in the thicker portion 138 of the member 136 will be more consistent than strains in the thinner portion 140 of the member.

Figure 10:
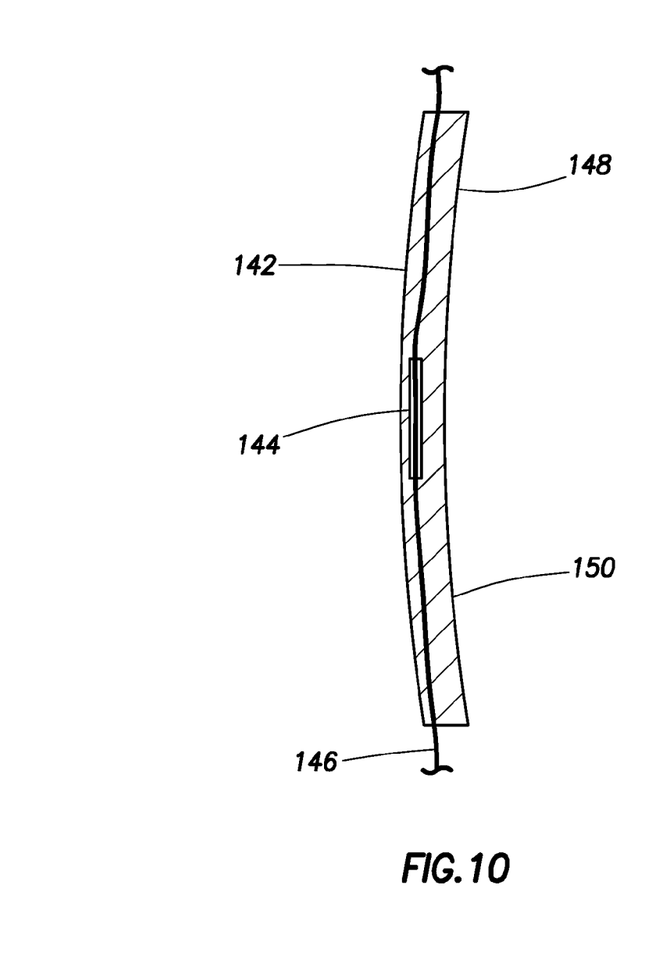
FIG. 10 is a cross-sectional view of a sixth alternate configuration of the disc-shaped member of the third differential pressure sensor.

Referring additionally now to FIG. 10, another configuration of a disc-shaped member 148 which may be used in the sensor 88 is representatively illustrated. The member 148 is similar to the member 136 described above, except that instead of having two convex sides 142, the member 148 has a convex side 142 and an opposing concave side 150.

Depending on the curvatures or other shapes of these sides 142, 150, the member 148 may have relatively thicker and thinner portions. As depicted in FIG. 10, the member 148 has a relatively consistent thickness. However, the element 144 could be positioned in a relatively thicker portion of the member 148 in keeping with the principles of the invention.

Preferably, if the direction of the pressure differential is known beforehand, the element 144 is positioned closer to the convex side 142 than to the concave side 150, and the convex side is exposed to the higher of the two pressures applied to the member 148. In this manner, the element 144 will experience compressive (rather than tensile) strain, and the member 148 will be better able to structurally withstand the pressure differential applied to it. This may enable a thinner member 148 to be used for a given pressure differential, enabling higher strain values to be detected.

Figure 11:
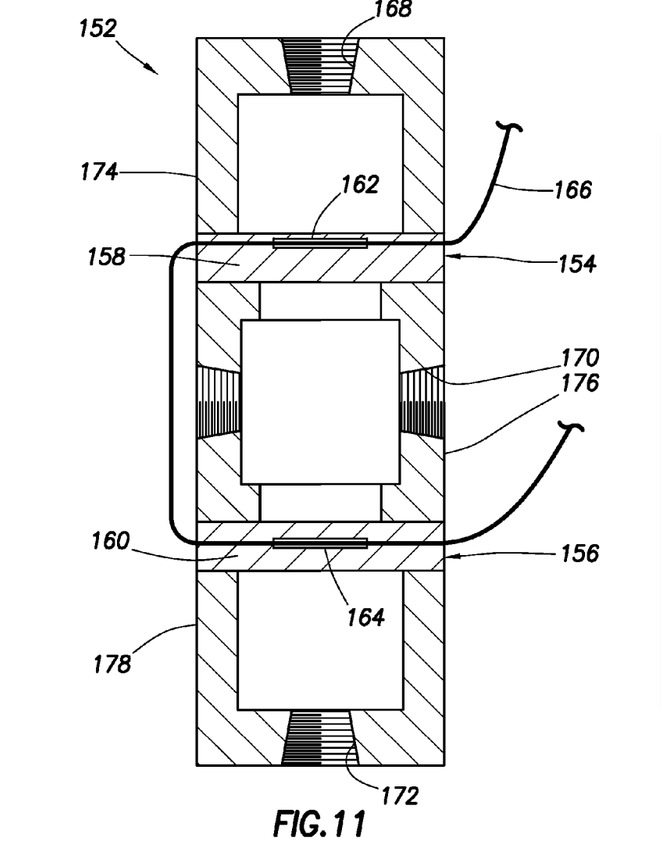
FIG. 11 is a cross-sectional view of a fourth differential pressure sensor which may be used in the system of FIG. 1.

Referring additionally now to FIG. 11, another differential pressure sensor 152 is representatively illustrated. The sensor 152 is similar to the sensor 88 described above, except that multiple walls 154, 156 are used to enable multiple pressure differentials to be detected. This is similar also to the manner in which the multiple tubular members 60, 62, 64 (which are also walls) of the sensor 58 described above enable multiple pressure differentials to be detected.

The wall 154 includes a generally disc-shaped member 158 having a strain sensing element 162 embedded therein. The wall 156 includes a generally disc-shaped member 160 having a strain sensing element 164 embedded therein. The elements 162, 164 may be included on a single optical fiber 166, or multiple optical fibers may be used if desired.

A port 168 formed in a housing 174 communicates an upper side of the wall 154 with a pressure source. A port 170 formed in an intermediate housing 176 communicates a lower side of the wall 154 and an upper side of the wall 156 with another pressure source. A port 172 formed in a lower housing 178 communicates a lower side of the wall 156 with yet another pressure source.

Note that the housings 174, 176, 178 could be separately or integrally formed, or could be formed of any number of separate elements, as desired. Any number of walls could be used for detecting any number of pressure differentials, and the members 158, 160 and elements 162, 164 could be configured as shown in any of FIGS. 4-10 above, or in any other configuration, in keeping with the principles of the invention. For example, the housing 176 could be hexagonal in shape with six walls distributed about it (instead of the two walls 154, 156 depicted in FIG. 11), each of the walls including a strain sensing element, and each of the walls being exposed to a pressure differential, so that six different pressure differentials could be sensed.

Figure 12:
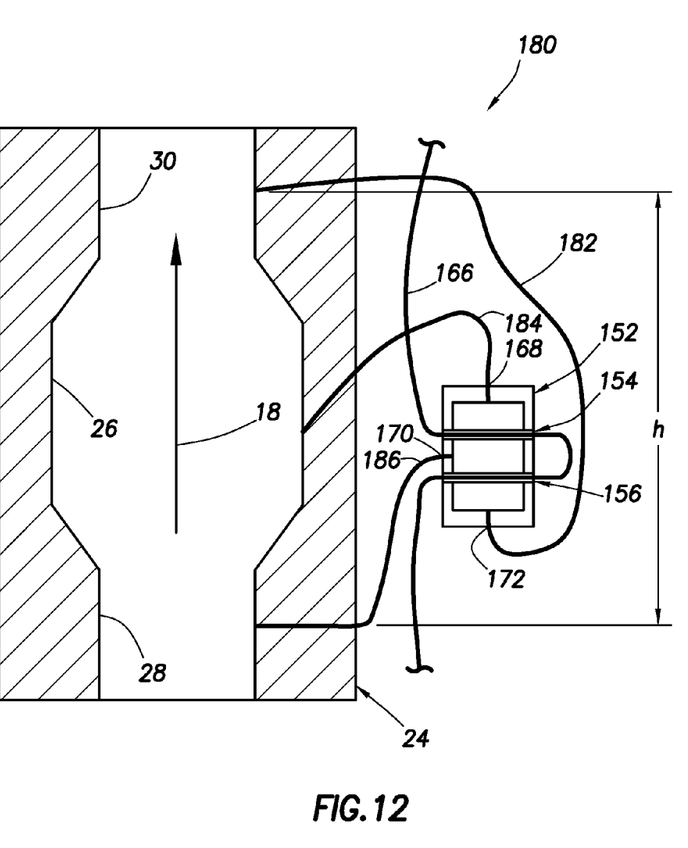
FIG. 12 is a cross-sectional view of the fourth differential pressure sensor connected to a fluid property sensing housing of the system of FIG. 1.

Referring additionally now to FIG. 12, the sensor 152 is depicted as being used in a differential pressure sensor system 180, which may be used in the system 10 of FIG. 1. As depicted in FIG. 12, the sensor 152 is connected to the housing 24 via lines 182, 184, 186 extending external to the housing 24. However, it should be understood that it is not necessary for the lines 182, 184, 186 to be external to the housing 24, since the sensor 152 could, for example, be incorporated into the housing (or another portion of the tubular string 12) and the sensor could be connected to the passage portions 26, 28, 30 via lines internal to the housing. Thus, it is not necessary for the housing 24 (or other portion of the tubular string 12) to be separate from the housings 174, 176, 178.

The line 182 provides communication between the passage portion 30 and the port 168 for applying pressure in the passage portion 30 to the upper side of the wall 154. The line 184 provides communication between the passage portion 26 and the port 172 for applying pressure in the passage portion 26 to the lower side of the wall 156. The line 186 provides communication between the passage portion 28 and the port 170 for applying pressure in the passage portion 28 to the upper side of the wall 156 and to the lower side of the wall 154.

Thus, the wall 154 has a pressure differential between the passage portions 26, 28 applied across it, and the wall 156 has a pressure differential between the passage portions 28, 30 applied across it. Given a known vertical distance h between the locations at which the pressures in the passage portions 28, 30 are sampled, and the pressure differential detected by the strain experienced by the element 164 in the wall 156, the density of the fluid 18 may be readily determined. Once the density of the fluid 18 is determined, the pressure differential (between the passage portions 26, 28) detected by the strain experienced by the element 162 in the wall 154 may be used to accurately determine the flow rate of the fluid 18.

Thus, a single sensor 152 having a single optical fiber 166 may be used in the system 180 to determine multiple properties of the fluid 18 in the system 10. Note that the sensor 58 depicted in FIG. 3 could be used in the system 180 in place of the sensor 152. These sensors, and other configurations of sensors embodying principles of the invention may be used in other systems, as well.

In each of the examples of applications of the principles of the invention described above, at least one optical fiber having a strain sensing element thereon is used to detect strain in a wall exposed to a pressure differential. However, it should be clearly understood that the principles of the invention are not limited to use of only optical fibers in sensing strain. For example, other types of optical medium could be used in place of the optical fiber(s) in the embodiments of the invention described above. An optical fiber is merely one type of optical medium which could be used in sensing strain in a wall exposed to a pressure differential.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A differential pressure sensor system for use in a subterranean well, the system comprising:
    a fluid property sensing housing having a flow passage formed therethrough, the flow passage having first, second and third longitudinally distributed portions, the second portion being positioned between the first and third portions, and a flow area of the second portion being greater than a flow area of each of the first and third portions; and
    a differential pressure sensor including an optical medium attached to a first wall having a first side and a second side, each of the first and second sides being exposed to pressure in the flow passage.

2. The system of claim 1, wherein the first wall first side is exposed to pressure in the first flow passage portion, and wherein the first wall second side is exposed to pressure in the second passage portion.

3. The system of claim 1, wherein the differential pressure sensor includes a second wall having first and second sides, each of the second wall first and second sides being exposed to pressure in the flow passage.

4. The system of claim 3, wherein the first wall first side is exposed to pressure in the first flow passage portion, the first wall second side is exposed to pressure in the second passage portion, the second wall first side is exposed to pressure in the first flow passage portion, and the second wall second side is exposed to pressure in the third flow passage portion.

5. The system of claim 1, wherein the first wall includes a substantially rigid generally tubular member, the optical medium being attached to the tubular member so that the optical medium detects strain in the tubular member.

6. The system of claim 5, wherein an interior of the tubular member is in communication with one of the first, second and third flow passage portions, and wherein an exterior of the tubular member is in communication with another of the first, second and third flow passage portions.

7. The system of claim 1, wherein the optical medium is embedded within the first wall.

8. The system of claim 7, wherein the first wall is a generally planar member.

9. The system of claim 8, wherein the planar member is generally disc-shaped.

10. The system of claim 7, wherein the first wall is a generally tubular member.

11. The system of claim 1, wherein the first wall further includes a substantially flexible membrane isolating the optical medium from direct contact with fluid in the flow passage.

12. The system of claim 1, wherein the optical medium comprises an optical fiber.

13. A differential pressure sensor system for use in a subterranean well, the system comprising:
    a fluid property sensing housing having a flow passage formed therethrough; and
    a differential pressure sensor including an optical medium attached to a first wall having a first side and a second side, each of the first and second sides being exposed to pressure in the flow passage, and the pressure sensor further including multiple strain sensing elements, at least one of the strain sensing elements experiencing compressive strain in response to exposure of the first wall to pressure in the flow passage, and another of the strain sensing elements experiencing tensile strain in response to exposure of the first wall to pressure in the flow passage.

* * * * *